United States Patent [19]

Beerwald et al.

[11] Patent Number: 4,473,596
[45] Date of Patent: Sep. 25, 1984

[54] PLASMA METHOD FOR COATING THE INSIDE SURFACE OF A GLASS TUBE

[75] Inventors: Hans Beerwald, Kall-Sistig; Günter Böhm; Günter Glomski, both of Bochum; Manfred Wittmann, Hardthof, all of Fed. Rep. of Germany

[73] Assignee: International Standard Electric Corporation, New York, N.Y.

[21] Appl. No.: 464,808

[22] Filed: Feb. 8, 1983

[30] Foreign Application Priority Data

Feb. 11, 1982 [DE] Fed. Rep. of Germany ....... 3204846

[51] Int. Cl.$^3$ ............................................... B05D 7/22
[52] U.S. Cl. ....................................... 427/10; 427/38; 427/39; 427/238
[58] Field of Search ...................... 427/10, 38, 39, 238

[56] References Cited

U.S. PATENT DOCUMENTS

| 3,560,248 | 2/1971 | Padgett et al. | 427/238 |
| 3,748,169 | 7/1973 | Keller | 427/39 |
| 4,145,456 | 3/1979 | Kuppers et al. | 427/39 |
| 4,349,373 | 9/1982 | Sterling et al. | 427/39 |
| 4,349,582 | 9/1982 | Beerwald et al. | 427/39 |

Primary Examiner—Norman Morgenstern
Assistant Examiner—Janyce A. Bell
Attorney, Agent, or Firm—John T. O'Halloran; Robert P. Seitter

[57] ABSTRACT

A method of making optical fibers by plasma chemical vapor deposition (PCVD) is disclosed wherein the pressure in the glass tube is maintained constant by controlling the rate of evacuation. The pressure-dependent controlled variable is preferably the impedance of the plasma-producing device, and the rate of evacuation is controlled in such a way that this impedance remains constant.

5 Claims, 1 Drawing Figure

U.S. Patent  Sep. 25, 1984  4,473,596
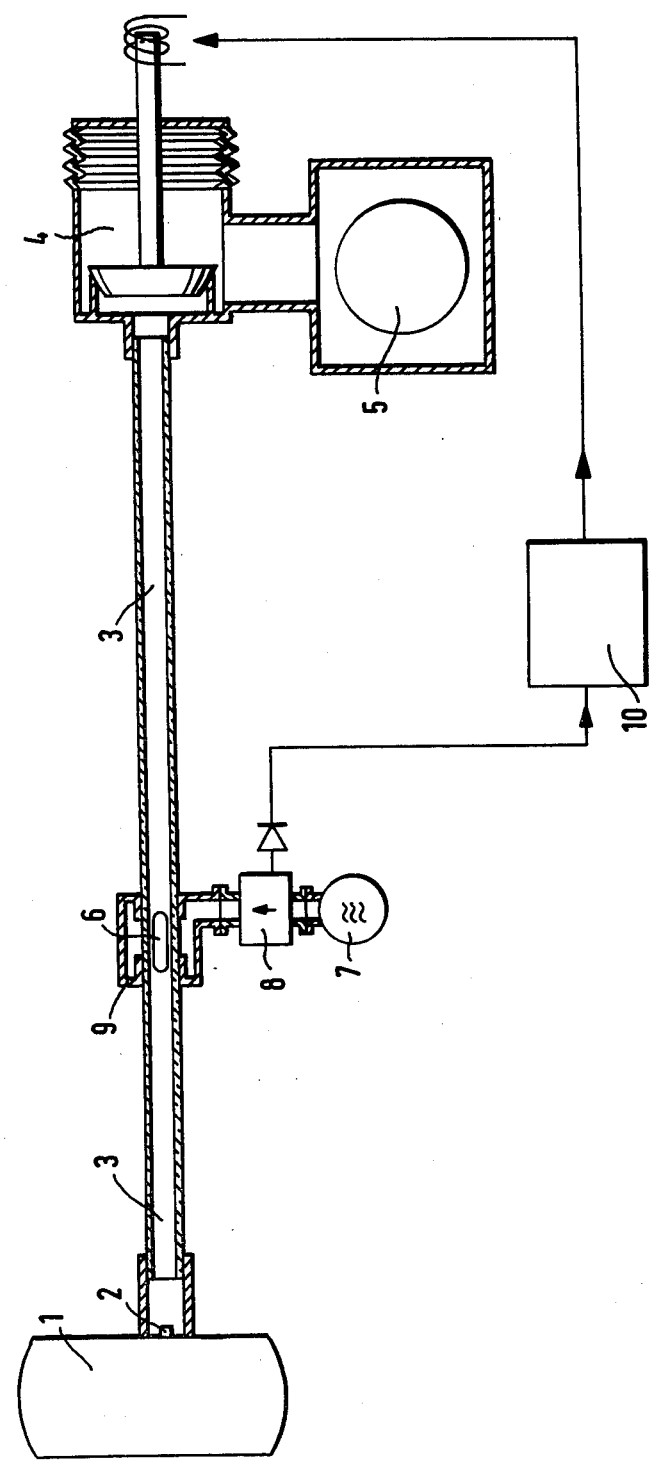

PLASMA METHOD FOR COATING THE INSIDE SURFACE OF A GLASS TUBE

The present invention relates to a plasma method for coating the inside surface of a glass tube by reactive deposition from a gas flowing through the tube and having a pressure ranging from 1 to 100 mbars, the plasma zone being moved relative to the tube in the axial direction. Obviously there is a pressure drop in the axial direction.

Such methods are needed for the fabrication of optical fibers for communication systems. Quartz tubes whose inside walls are coated with doped quartz glass are processed into rods which are subsequently drawn into fibers.

Coating methods using an axially moving plasma zone are in the prior art (DE-OS No. 23 28 930, German Pat. No. 24 44 100, German Pat. No. 26 42 949, DE-OS No. 27 12 993, DE-OS No. 28 04 125, DE-OS No. 29 29 166). These methods suffer from the disadvantage that the plasma state changes during the axial movement of the plasma zone. Electron temperature, degree of ionization, gas temperature and absorbed electric power change with gas density and flow rate along the tube. To achieve a coating of as uniform a quality as possible, either the rate of gas flow is kept low or a high gas density is chosen. Both measures result in a reduction of the relative pressure difference between the beginning and the end of the tube.

A low rate of gas flow means a low deposition rate; a high gas pressure results in undesirable particle formation in the gas volume (J. Irven, A. Robinson: "Optical fibres produced by plasma augmented vapour deposition", Physics & Chem. of Glasses, Vol. 21 (1980)).

The object of the invention is to maintain the plasma state during the axial movement constant.

The invention is characterized in that, with gas flow maintained constant, the gas density in the plasma zone or an electrical variable dependent thereon is maintained constant by controlling the rate of evacuation.

At gas pressures >1 mbar and with tube radii on the order of 1 cm, electron density decreases an electron collision frequency increases with increasing gas pressure (gas density). Both effects result in a reduction in plasma conductivity, i.e., an increase in plasma impedance.

To eliminate the need for additional electric apparatus, the impedance of the plasma-producing device can be used to control the rate of evacuation. In most cases, a voltage or current value dependent on the impedance will suffice for the control.

The advantage offered by the invention is that a highly uniform coating along the tube is achieved with low gas densities or high gas flows. With a predetermined gas density, compared with conventional methods, the rate of gas flow and, thus, the deposition rate can be increased.

An embodiment of the invention as claimed in claim 3 is illustrated in the accompanying drawing. A vessel 1 holds a gas mixture of $O_2$ and $SiCl_4$ in the molar ratio of 4:1; the gas pressure is maintained constant at 200 mbars. The gas mixture flows through the nozzle 2 into the quartz tube 3 to be coated. The smallest diameter of the nozzle 2 is 1 mm. In this embodiment the gas pressure at the beginning of the tube is always lower than 20 mbars, so that, due to the decrease of pressure caused by the nozzle 2, the rate of gas flow is 40 mbars l/s and is independent of the position of the valve 4, which is more or less open. The suction capacity of the vacuum pump 5 is 100 $m^3$/h. The plasma zone 6 is produced by means of microwave power (2 kW at 2.45 GHz). The entire microwave apparatus, consisting of a magnetron 7, a unidirectional transmission line 8 (circulator with water load), and a plasma-producing device 9, is moved to and fro over a tube length of 1 m four times per minute. The circulator 8 has at its water load a probe with a diode detector whose output voltage is proportional to the reflected microwave power, which amounts to 5 to 10% of the downstream power. With the aid of an electronic comparator 10, the electromagnetic valve 4 is controlled in such a way that the output voltage of the diode detector remains constant. The comparator is adjusted so that the valve 4 is wide open when the plasma zone is at the beginning of the tube. As the plasma zone moves toward the end of the tube, the rate of evacuation is automatically reduced by means of the valve 4; as the plasma zone moves back, the valve opens again. In the present example, the gas pressure at the end of the tube varies between 5 and 7 mbars. The $SiO_2$ coating is deposited at a rate of 1.2 g/min.

We claim:

1. A method of coating the inside surface of a glass tube by the steps of:
   feeding a gas mixture through the tube at a substantially constant flow rate and maintaining the gas pressure within a range of about 1 to about 100 mbars;
   forming a plasma zone in the tube and moving said zone along the tube in the axial direction thereof;
   controlling the rate of evacuation to maintain the gas density in the plasma zone substantially constant.

2. A method in accordance with claim 1, wherein the evacuation rate is controlled by maintaining constant an electrical variable dependent on the gas density in the plasma zone.

3. A method in accordance with claim 1, wherein the plasma is produced by a plasma producing device including a microwave power apparatus, the evacuation rate is controlled so that the impedance of the plasma producing device is maintained constant.

4. A method in accordance with claim 3 including the step of producing a signal measuring the microwave power reflected from the plasma producing device and wherein the evacuation rate is controlled by maintaining said signal constant.

5. A method in accordance with claim 1, wherein the evacuation rate is controlled by reducing it as the plasma zone moves from the inlet end of the tube to the discharge end.

* * * * *

UNITED STATES PATENT AND TRADEMARK OFFICE
CERTIFICATE OF CORRECTION

PATENT NO. : 4,473,596
DATED : September 25, 1984
INVENTOR(S) : Hans Beerwald-Gunter Bohm-Gunter Glomski-Manfred Wittmann It is certified that error appears in the above-identified patent and that said Letters Patent are hereby corrected as shown below:

Title page:

Please Amend Assignee to read as follows:

Scott Glaswerke, Federal Republic of Germany and
International Standard Electric Corporation, New York, New York Signed and Sealed this Eighth Day of April 1986

[SEAL]

Attest:

DONALD J. QUIGG

Attesting Officer

Commissioner of Patents and Trademarks